United States Patent
Kurosu

(10) Patent No.: US 9,146,042 B1
(45) Date of Patent: Sep. 29, 2015

(54) PORTABLE HEATER DEVICE FOR BENDING PLASTIC PIPE

(71) Applicant: Alan Kurosu, Ewa Beach, HI (US)

(72) Inventor: Alan Kurosu, Ewa Beach, HI (US)

( * ) Notice: Subject to any disclaimer, the term of this patent is extended or adjusted under 35 U.S.C. 154(b) by 345 days.

(21) Appl. No.: 13/900,412

(22) Filed: May 22, 2013

(51) Int. Cl.
| | |
|---|---|
| *A47J 27/00* | (2006.01) |
| *F24H 3/02* | (2006.01) |
| *A45D 20/10* | (2006.01) |
| *F24H 3/04* | (2006.01) |
| *F24H 9/00* | (2006.01) |

(52) U.S. Cl.
CPC ............ *F24H 3/0405* (2013.01); *F24H 9/0063* (2013.01)

(58) Field of Classification Search
None
See application file for complete search history.

(56) References Cited

U.S. PATENT DOCUMENTS

| | | | |
|---|---|---|---|
| 1,407,412 A | 2/1922 | Harvey | |
| 3,466,020 A * | 9/1969 | Blinne | 432/88 |
| 3,843,858 A | 10/1974 | Buell | |
| RE28,665 E * | 12/1975 | Zagoroff | 431/347 |
| 4,094,076 A * | 6/1978 | Baslow | 34/90 |
| 4,097,573 A * | 6/1978 | Parmann | 264/322 |
| 4,110,603 A * | 8/1978 | Peterson et al. | 219/535 |
| 4,255,137 A * | 3/1981 | Guyer | 432/225 |
| 4,551,615 A * | 11/1985 | Wilson | 392/385 |
| 5,017,760 A * | 5/1991 | Miller | 219/390 |
| 5,467,540 A * | 11/1995 | Bastien | 34/97 |
| 5,606,640 A * | 2/1997 | Murphy | 392/382 |
| 6,033,213 A * | 3/2000 | Halvorsen, Jr. | 432/225 |
| 6,038,782 A * | 3/2000 | Schepisi | 34/97 |
| 6,257,880 B1 * | 7/2001 | Hirayama | 432/225 |
| 6,561,797 B1 * | 5/2003 | Johnson | 432/225 |
| 6,971,872 B1 * | 12/2005 | Jimenez | 432/225 |
| 7,101,457 B1 * | 9/2006 | Huffman | 156/711 |
| 7,133,606 B1 * | 11/2006 | Elliott et al. | 392/411 |
| 7,976,306 B2 * | 7/2011 | Perry et al. | 432/225 |
| 2011/0239483 A1 * | 10/2011 | Rotondi | 34/487 |

FOREIGN PATENT DOCUMENTS

CA          1007023          3/1977

* cited by examiner

*Primary Examiner* — Thor Campbell
(74) *Attorney, Agent, or Firm* — Leighton K. Chong

(57) ABSTRACT

A portable heating device for heating plastic tubing or pipe has a straight, hollow heating tube with an inner diameter larger than an outer diameter of the plastic tubing or pipe to be heated therein. A hot air gun directs a flow of hot air into the heating tube. A heat adjustment mechanism holds the hot air gun at an adjustable distance from the plastic tubing so that the hot air flow at the input end is at an optimum temperature range for softening the plastic tubing. The device is inexpensive to manufacture and easy to assemble, and avoids the use of expensive mechanical components. An optional heat retaining tail piece equipped with a cooling fan may be used to transfer the hot air flow air quicker through the heating tube.

8 Claims, 3 Drawing Sheets

PORTABLE HEATER DEVICE FOR BENDING PLASTIC PIPE

BACKGROUND ART

The present invention relates to a device for heating plastic (PVC) tubing or pipe for the purpose of bending, shaping or forming heat-softened plastic tubing into turns, bends, and/or curved shapes.

Rigid plastic tubing, such as polyvinylchloride (PVC) tubing, is widely used in construction industries to form electrical conduits, plumbing, ducting, interior support structures, etc. The PVC tubing is typically supplied as stock material in predetermined lengths at a construction site, and commonly must be bent, shaped, or formed with turns, bends or curves to specific job layout requirements.

Various methods have been used for heating PVC tubing at a job site. Heating PVC tubing over an open flame is wasteful, can result in uneven heating, and can be dangerous. The torch method can result in burning the heated PVC pipe and is dangerous to use near combustable materials. It also creates toxic fumes while the PVC pipe is heated or burned. It also requires gas to be provided from propane cylinders that need to be refilled regularly, costing the contractor time and money.

Box heating ovens with resistance-type heating elements have been used, but are expensive, of fixed dimensions not readily adaptable to bending tubing of different lengths, and are energy inefficient and expensive. Use of box heating ovens is also very labor intensive and must be constantly monitored during the heating procedure. Examples of box heating ovens are shown in U.S. Pat. Nos. 6,971,872, 6,561,797, 5,017,760, 3,843,858, and 1,407,412, and Canadian Patent 1,007,023 issued March 1977.

U.S. Pat. No. 6,033,213 shows a tubular heating device in which hot air from an air heat gun or blower is injected into a port in the midsection of a tubular housing against a diffuser plate and directed along the PVC pipe length on both sides. However, this method can result in excessive heat at the diffuser plate and uneven heating of the outside surface of the pipe compared to its inside surface.

Other PVC pipe heating methods use flexible heater elements that are inserted into the PVC pipe itself to heat it from the inside. (PVC BEND IT) This method is very labor intensive, expensive, and only heats the pipe from the inside surface. Also, a different heating element would be needed to heat different pipe lengths and diameters.

SUMMARY OF INVENTION

It is therefore a principal object of the present invention to portable heating device that can evenly and efficiently heat an entire segment of PVC tubing or pipe of various lengths to allow bending thereof.

It is another object of the invention to use high temperature forced air to heat a length of PVC pipe from the inside and outside simultaneously to allow even bending thereof.

It is another object of the invention to use an inexpensive form of heat source and to conduct the heat in a manner that ensures even heating of various lengths of PVC tubing in a short amount of time. The heating device is also to be inexpensive to manufacture and easy to assemble, and avoids the use of expensive mechanical components such as baffles, barriers, or perforated shields.

In accordance with the present invention, a portable heating device for plastic tubing or pipe comprises:

a straight, hollow heating tube made of metal of a given length and inner diameter having an input end and an output end, wherein the inner diameter of the heating tube is selected to be larger than an outer diameter of a standard length of plastic tubing or pipe which is to be inserted into the output end up to the input end of the heating tube, in order to provide sufficient spacing around the outer diameter of the standard plastic tubing or pipe so that a hot air flow in the heating tube can heat the outside of the plastic tubing or pipe as well as its inside;

a hot air gun or other source of forced hot air configured to direct a flow of hot air into the input end of the heating tube and down its length to its output end; and a heat adjustment mechanism for holding the hot air gun at an adjustable distance from an insert position to which a plastic tubing or pipe is to be inserted to the input end of the heating tube, said heat adjustment mechanism having an adjustment member for adjusting the distance of the hot air gun from the insert position so that the hot air flow directed into the input end of the heating tube will heat the inserted end of the plastic tubing or pipe to within an optimum temperature range that is low enough not to scorch the inserted end, yet is high enough that the hot air flow can soften the length of the plastic tubing or pipe inserted in the heating tube.

In a preferred embodiment, the heating adjustment mechanism is formed by an input tube configured to have a proximal end clamped to the end of the hot air gun nozzle, and a distal end sleeved around the input end of the heat dampening manifold (HDM), and the distance of the hot air gun to the HDM is adjusted by telescoping the distal end of the input tube around the input end of the HDM. An optimum temperature range for the insert position for PVC plastic tubing of 2¼ inch outer diameter is about 340 to 350 degrees Fahrenheit, and most preferably 340 degrees Fahrenheit.

The hot air gun may be a conventional hot air blower with a heating element that uses only about 600 to 1800 watts of electricity. The heating tube is preferably made of stainless steel pipe of 2½ inch inner diameter and 10-foot length.

The portable heating device can heat an inserted PVC pipe of 2¼ inch outer diameter and 10-foot length evenly on the inside and outside. It uses the confined space around and inside the inserted pipe to heat the pipe evenly to its bendability temperature with little waste of energy. The portable heating device is also inexpensive to manufacture and easy to assemble, and avoids the use of expensive mechanical components such as baffles, barriers, or perforated shields.

Other objects, features, and advantages of the present invention will be explained in the following detailed description of the invention having reference to the appended drawings.

DESCRIPTION OF EMBODIMENTS

In the following detailed description of the invention, certain preferred embodiments are illustrated providing certain specific details of their implementation. However, it will be recognized by one skilled in the art that many other variations and modifications may be made given the disclosed principles of the invention.

Figure 1:
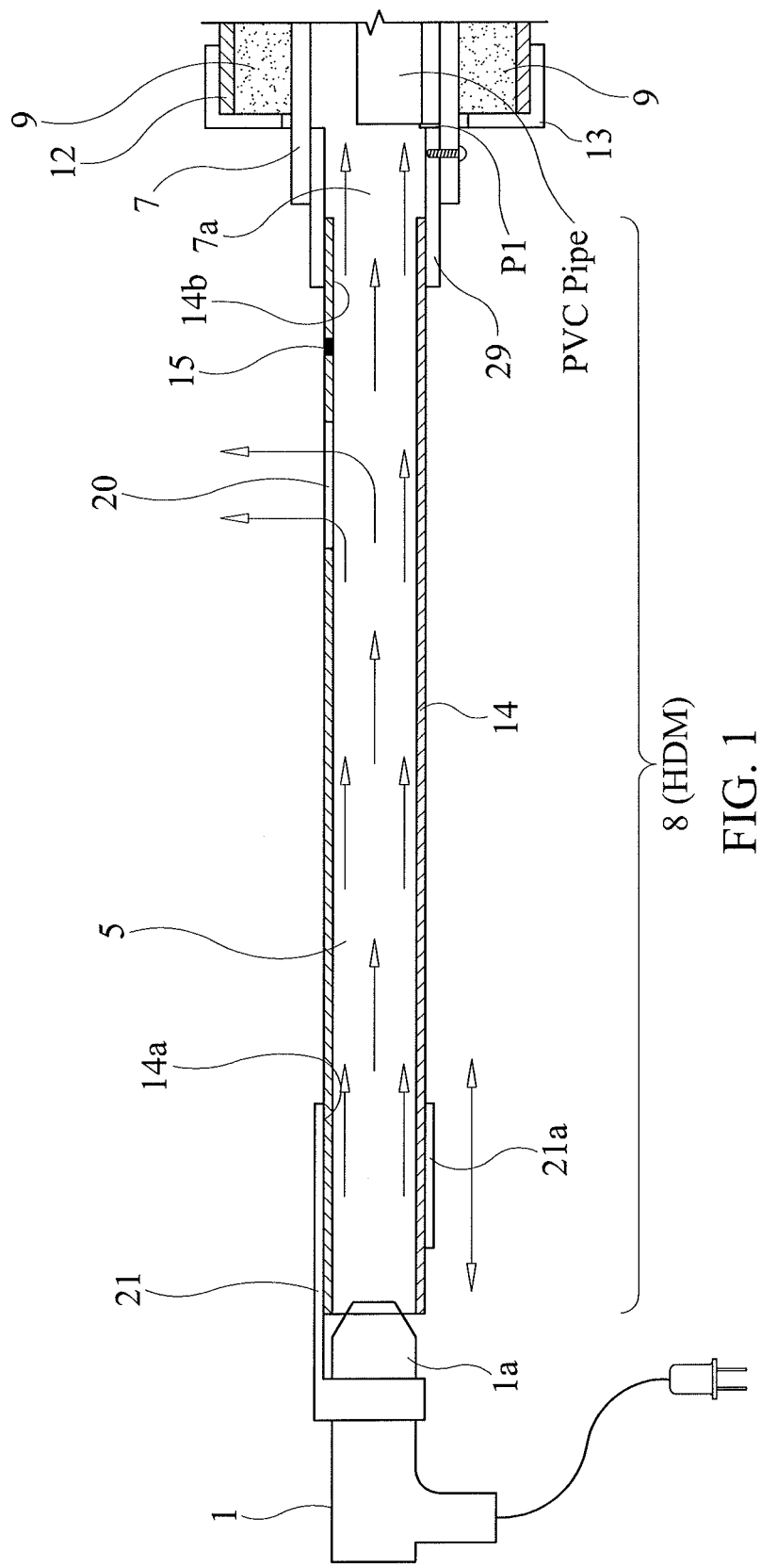
FIG. 1 shows a side sectional view of an input side to a heating tube of a portable heating device using a hot air gun and a heat dampening manifold (HDM).

FIG. 1 shows a side sectional view of an input side to a heating tube of a portable heating device. The input side of the portable heating device employs a hot air gun 1 (or other suitable source of forced hot air) for providing a hot air flow (indicated by arrows) into a straight, hollow heating tube 7 having an input end 7*a* and an output end 7*b*. The heating tube 7 conducts the hot air flow from the nozzle 1*a* of the hot air gun 1 directed at its input end 7*a* down its length to its output end 7*b*. The heating tube 7 is made of metal and has a given length sufficient to accommodate a standard length of plastic tubing or pipe PP therein, such as a length of 10 feet, and a given inner diameter selected to be larger than an outer diameter of the standard plastic tubing or pipe PP, which is to be inserted into the output end 7*b* up to an insert position P1 (marked by thin pins inserted on opposing diametral sides) at the input end 7*a* of the heating tube 7. The larger, inner diameter of the heating tube 7 ensures sufficient spacing around the outer diameter of the plastic tubing or pipe PP so that the hot air flow can heat the outside surface of the plastic tubing or pipe PP as well as its inside surface.

A heat dampening manifold (HDM) 8 is provided as a heating adjustment mechanism between the hot air gun 1 and the input end 7*a* of the heating tube 7. The HDM includes an input tube 21 configured to have a proximal end clamped to the end of the hot air gun nozzle 1*a*, and a distal end 21*a* sleeved around an input end 14*a* of an HDM tube 14. The output end 14*b* of the HDM tube 14 is placed in abutment with the input end 7*a* of the heating tube 7, and may be coupled together with a clamp, ring coupler, or suitable fastener. The distance of the hot air gun nozzle to the input end 7*a* of the heating tube 7 is adjusted by telescoping the distal end 21*a* of the input tube 21 around the input end 14*a* of the HDM tube 14 (indicated by the two-headed arrows).

The function of the heat dampening manifold HDM 8 is to adjust the temperature of the hot air exiting from the hot air gun 1 to an optimum temperature range at the insert position P1 for PVC plastic tubing at the input end 7*a* of the heating tube 7. For a standard type of hot air gun on a high heat setting, the exit temperature is typically 750 degrees Fahrenheit, whereas the optimum temperature range at the insert position P1 for PVC plastic tubing of 2¼ inch outer diameter is about 340 to 350 degrees Fahrenheit, and most preferably 340 degrees Fahrenheit. For this example, the slidable input sleeve 21 may be 6¾ inches long and have a sliding range of 1½ inches. The HDM tube 14 may be 26 inches long. A shorter HDM tube pipe may be used for smaller-diameter PVC pipe requiring less hot air flow. For example, with the standard type of hot air gun on a low heat setting, the exit temperature is typically 450 degrees Fahrenheit, and the HDM tube may be 12 inches long.

The HDM tube 14 may be provided optionally with an air vent 20 that may be opened and closed to further adjust the temperature of the hot air flow reaching the input end 7*a* of the heating tube 7. For example, to preheat the heating tube 7, the air vent 20 may be closed to seal off the hot air flow to the heating tube 7, which speeds up (shortens) the preheat time. When the heating tube is heated and a PVC pipe is inserted, surplus hot air may be vented to prevent excess heat at the input end 7*a* of the heating tube 7. Exhausting the surplus hot air through the air vent 20 is thus used to control the air temperature entering the heating tube.

Temperature gauge access port 15 is provided (through the external casing) into the HDM and heating tube for the user to insert a temperature probe to monitor the temperature of the hot air flow at the insert position P1. Another temperature gauge access port 16 may also be provided along the front of the removable heat retaining tail piece (described below) to monitor the downstream or output end temperature of the hot air flow in the heating tube.

The hot air gun may be a conventional hot air blower with a heating element that uses only about 600 to 1400 watts of electricity, such as the Milwaukee Dual Temperature Heat Gun #8975-6 sold by Milwaukee Electric Tool Corporation, Brookfield, Wis. The hot air gun is selected to supply a clean, efficient source of high temperature convection air flow. The hot air gun source may be readily removed from the apparatus for disassembly and storage. The temperature probe may be a commercial type of temperature probe, digital thermometer, or an inexpensive type of common grill thermometer.

A preferred type of heating tube is stainless steel tubing, type 304, having an inside diameter of 2¹¹⁄₃₂ inches, outside diameter of 2½ inches, wall thickness of ¹⁄₁₆ inch, and length of 10 feet, which is commonly available as a stock part from construction supply stores. The stainless steel material is found to aid in maintaining the high temperature in the air flow to the end of the heating tube efficiently with a minimal amount of temperature drop. The stainless steel polished interior allows for superior heated air velocity flow to move from front to back within the heat tube, and reduces turbulence and air restriction.

Figure 2:
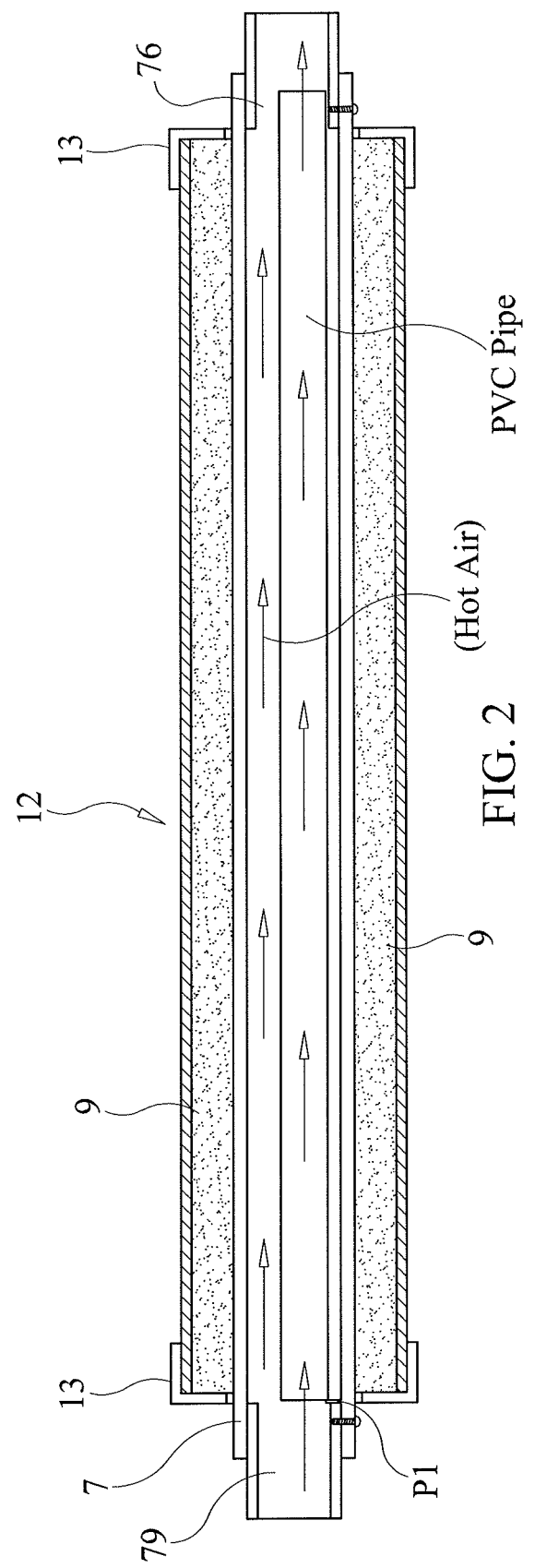
FIG. 2 a side sectional view of a heating tube of the portable heating device contained within an insulation casing.

FIG. 2 shows a sectional view of the heating tube 7 of the portable heating device contained within an insulation jacket 9, an external casing 12, and end caps 13. The insulated casing insulates the heating tube 7 when heated in use sufficiently that the outer temperature of the casing wall is at a level safe to touch. A preferred insulation jacket is Knauf brand fiberglass batting sold by Admor HVAC Products Inc., Honolulu, Hi., having a length of 9 ft, inside diameter of 2⅛ inches/ increased to 2½ inches, outside diameter of 3 inches, rated for temperature up to 1000° F. The insulation reduces the amount of heat loss thru the stainless steel heating tube, to make the process more efficient and effective, and retain heat for heating the inserted PVC tubing. A preferred heating tube casing is 4-inch ABS-DWV pipe, having an inside diameter of 4 inches, outside diameter of 4½ inches, wall thickness of ⅜ inch, and length used of 9 feet. A preferred end cap may be 4-inch ABS having an inside diameter of 4½ inches, and outside diameter of 5 inches, and center hole diameter of 3¼ inches through which both ends of the heating tube project.

In operation, the portable heating device in accordance with the invention is found to elevate the temperature of the inserted section of PVC pipe evenly and efficiently to a temperature of bendability. It efficiently uses heated convection air flow supplied by a low-cost hot air gun. The fiberglass-insulated stainless steel heating tube is found to encapsulate and maintain a desired hot air flow for evenly heating the PVC material in a confined heated zone. The PVC pipe is exposed to the high temperature convection air stream on both its inside and outside surfaces simultaneously, which increases the heat transfer to the inserted PVC pipe elevating its temperature evenly to the point of bendability. Once the bending point is reached, the inserted pipe can then be removed with protective gloves, and bent, shaped or formed into an infinite number of shapes or designs.

Testing has shown that an optimum input air temperature range for PVC pipe is about 340° F. to 350° F., and most preferably 340° F., for safe and controlled heating of the inserted PVC pipe. When the PVC pipe is inserted into the heating tube, it displaces a certain cross-sectional area due to its size and length, thereby restricting the heated air flow traveling through the heat tube. This creates a backed-up flow of heated air to the entrance of the heating tube. The adjustable air vent located at the end of the heat dampening manifold (HDM) may be opened to release surplus heated air into the atmosphere, thereby stabilizing the air temperature entering the heating tube.

Figure 3:
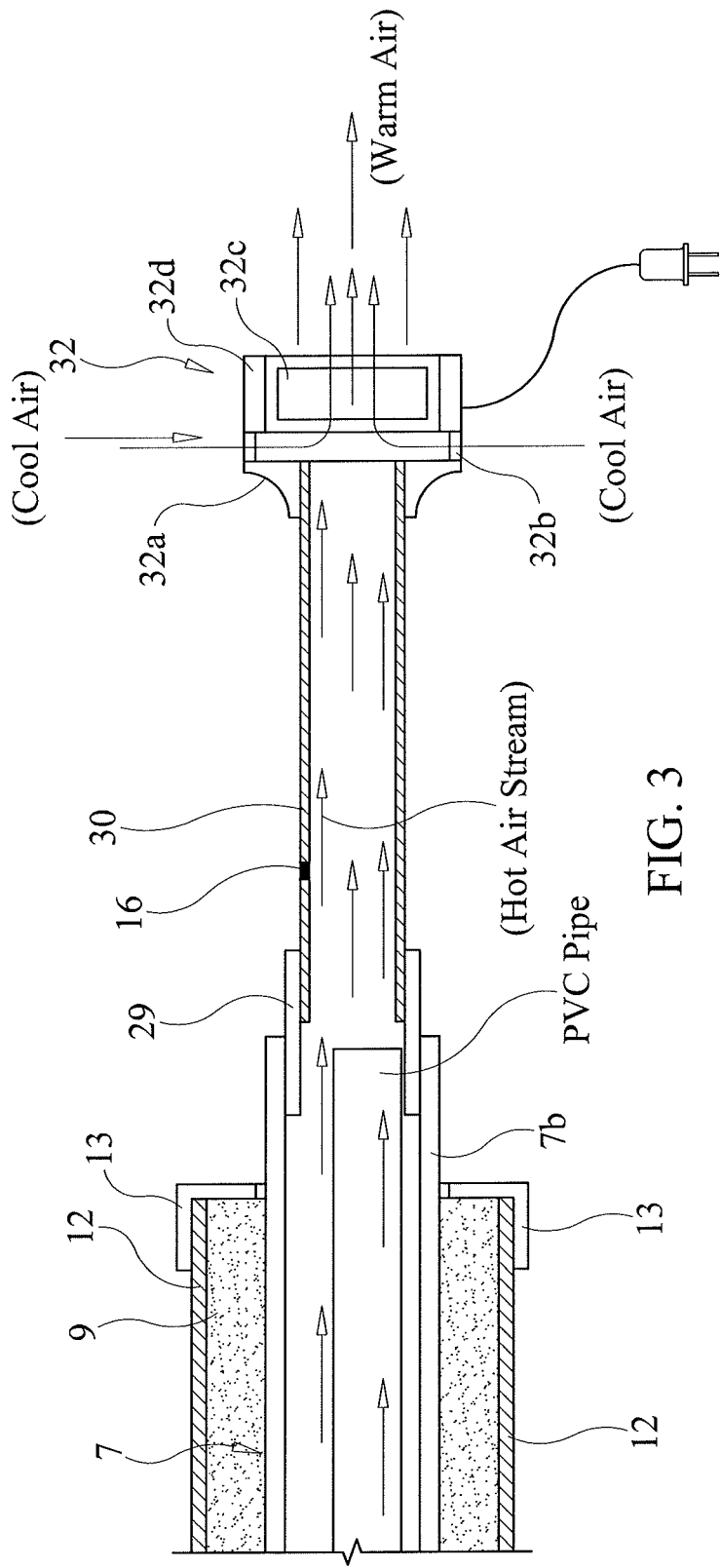
FIG. 3 shows a side sectional view of an output side from the heating tube of the portable heating device using an optional heat retaining tail piece and output fan.

FIG. 3 shows a side sectional view of an output side from the heating tube of the portable heating device using an optional heat retaining tail piece 30 and output fan 32. The tail piece 30 may be a short, straight piece of tubular pipe that has an input end coupled to the output end 7b of the heating tube 7 by a sleeve coupling 29. The output fan 32 is clamped by a clamp flange 32a to the output end of the tail piece 30. Cool air is inducted through spacer ports 32b to mix with the hot air flow exiting through the tail piece 30 pulled by fan blades 32c in a fan housing 32d, thus exiting as warm air. When the PVC pipe is inserted into the heating tube 7, the removable heat retaining tail piece 30 and cooling fan 32 mounted at its output end is inserted in the output end 7b of the heating tube 7 to encapsulate the inserted PVC pipe during the heating process. It also acts to assist the hot air flow and increase its air velocity through the heating tube. The PVC pipe can then be heated from the inside and the outside by the convection-heated air stream, thereby decreasing the time it takes to heat a section of pipe and utilizing the confined heat tube space to full advantage.

The cooling fan mounted at the end of the heat retaining tail piece draws heated air from the heat tube by slightly reducing the heat tubes interior pressure. This slight reduction in air pressure is created by the spinning fan blade mounted at the end of the removable tail piece. It increases the heating tube end air temperature and volume which decreases the time needed to bring the inserted PVC pipe to the point of bendability. As the heated air travels thru the heat tube the inserted PVC pipe creates a resistance and blockage for the traveling air stream. The tail piece fan reduces this resistance by drawing the heated air thru the heat tube faster and at a higher temperature. Tests have shown a decrease in bendability time of about 20% for small pipes to more than 36% for larger pipes.

Since the fan is mounted directly in the heated air stream, the moving heated air would eventually overheat the fan motor. To solve this problem the inline fan is secured to the flange mount surface with a ¼" air gap separating the flange end and fan motor mount housing. This air gap allows cool air from the outside to enter thru this gap and mix with the heated air coming from the heat tube before it passes the fan motor. This mixing of the two air streams decreases the air temperature passing around the fan motor and prevents it from overheating. A suitable type of cooling fan is 3" AC cooling fan (brushless) available from Radio Shack Corporation, Fort Worth, Tex.

Various tests were conducted to gather information to determine preferred materials and components for the portable heating device, and the results are summarized below.

Test 1: Comparison of Thermal Conductivity of Metals for Heating Tube:
1) silver . . . 418
2) copper . . . 394
3) aluminum . . . 238
4) iron . . . 80.2
5) stainless steel . . . 13

Results: Stainless steel had the lowest thermal conductivity of the listed metals. Its very low thermal conductivity means that it does not conduct electricity well and is also a poor conductor of heat compared to the other metals listed. This means less heat loss from the air traveling thru the heating tube because heat absorption in the pipe is low compared to the other metals. Stainless steel also has a high resistance to corrosion. Stainless steel was therefore found to be the best choice for the heating tube of the materials listed.

Test 2: Optimal Temperature Range at Input of the Heating Tube:

Testing for the ideal usable air temperature entering the heating tube was conducted over a 10 minute period per temperature level with the heat gun set at its highest setting, with an output at approximately 750° F. The heat gun was connected to a 26 inch long×2 inch wide heat dissipating manifold with an adjustable air vent opened to ¾ inch. The heat gun was adjusted to the heat dissipating manifold distance with the adjusting knob on the adjusting bracket until the desired entering heat tube air temperature range was reached. A ¾ inch 10-foot length of PVC pipe was inserted into the heating tube. Each temperature range was tested for a 10 minute period. A temperature probe was used to monitor the heating tube's input air flow temperature. A removable heat retaining tail piece was installed to simulate actual running conditions. Once the desired temperature was reached, the heated pipe was removed and a new pipe was installed to start the next in the series of tests.

400° F. . . . major deflection and charring
370° F. . . . deflection, slight to minimal charring
360° F. . . . slight deflection, slight discoloration
350° F. . . . no deflection, very slight discoloration
340° F. . . . no deflection and no discoloration Results: Optimal input air temperature range into the heating tube was found to be 340° F. to 350° F., and most preferably 340° F. This is the ideal temperature for efficient heating and bending using the portable heating device.

Test 3: Stainless Steel Tubing Compared to EMT Steel Tubing in Insulated Casing:
Preheat period . . . 20 minutes
Heat gun setting . . . high
Heat gun outlet air temp . . . 750° F.
Heat tube length . . . 10 ft
Insulation . . . fiberglass
Probe insertion depth . . . 1 inch
Heat retaining tail piece installed (no end fan assistance)

Temperature readings were taken from the input access Port A (15) to inner access Port B (16) of the heating tube. Approximate time between each test was 5 mins.

| Test 4: 2-inch EMT conduit 10 ft/fiberglass insulation: | | | |
| --- | --- | --- | --- |
| Time | Port A | Port B | Temperature Drop |
| 20 mins | 361 f | 271 f | 90 f |
| 20 mins | 360 f | 275 f | 85 f |
| 20 mins | 359 f | 281 f | 78 f |
| 20 mins | 358 f | 280 f | 78 f |
| Average | 359.5 f | 276.75 f | 82.75 f |

| Test 5: 2½ inch stainless steel tubing 10 ft/fiberglass insulation: | | | |
| --- | --- | --- | --- |
| Time | Port A | Port B | Temperature Drop |
| 20 mins | 353 f | 294 f | 59 f |
| 20 mins | 357 f | 290 f | 67 f |
| 20 mins | 351 f | 281 f | 70 f |
| 20 mins | 350 f | 283 f | 67 f |
| average | 352.75 f | 287 f | 65 f |

Results: Stainless steel tubing in the insulated casing had an average temperature retention 17° F. higher than the EMT steel tubing. Comparison of Tests 1 and 2 shows that the stainless steel tube has a lower temperature drop as the air travels thru the heating tube. It also had a higher end temperature at the outlet end of the heating tube, making it a better choice then EMT steel tubing.

Test 6: Heating Time to Optimum 340° F. For PVC Pipe at Insert Position:

The slidable input sleeve was 6¾ inches long and has a sliding range of 1½ inches. The HDM tube was 26 inches long. The heat gun setting was on high temperature setting. The optimum temperature of 340° F. at the insert position for the PVC pipe was reached in less then 1 minute (measured at the access port). A 10-minute preheat time is recommended for even efficient heat tube heating operation. The heating was maintained for 3 minutes for distances (heat gun to heating tube) of 30, 29, 28, 27, 26, 25, and 24 inches. The PVC pipe was then observed for any condition of damage. Distances (from heat gun to PVC pipe) below 16 inches showed signs of charring and discoloration, distances longer then 20 inches showed slight discoloration, and distances 24 inches and beyond showed no pipe damage. The recommended distance (from heat gun to PVC pipe) for the hot air gun on high heat setting is 26 inches to keep it at a safe distance from the heat gun. With the input tube having a sleeve-adjustment range of 1½ inches, the total range for fine adjustment of distance from heat gun to PVC pipe is 28 inches maximum and 26½ inches minimum.

Tests of heating time to good bendability for various types of PVC pipe showed the following provided good results:
½" ID PVC pipe 4.5 mins
¾" ID PVC pipe 4.5 mins
1" ID PVC pipe 5 mins
1¼" ID PVC pipe 5.5 mins
1½" ID PVC pipe 6.5 mins Use of the optional heat retaining tail piece and output fan draws the hot air through the heating tube faster, and was found to reduce the heating time about 20% or more.

Test 7: Use of Air Vent Opening for Adjustment of Heating Temperature

The air vent is closed during preheating of the heating tube so that all the hot air flow is transferred quickly to the end of the heating tube. This speeds up the preheat time. The air vent is opened to vent surplus hot air that is collected at the front of the heating tube when a PVC pipe is inserted. Exhausting surplus hot air allows fine control of the air temperature entering the heating tube during pipe heating. Tests were conducted on varying the air vent opening to obtain the optimum temperature for various types of PVC pipe, and the following were found to be the recommended air gaps:
Example ⅛" air vent opening for ½ ID PVC pipe
¼" air vent opening for ¾ ID PVC pipe
⅜ " air vent opening for 1" ID PVC pipe
½" air vent opening for 1¼" ID PVC pipe
⅝" air vent opening for 1½" ID PVC pipe Once the air vent gap is set, the air temperature can be more finely adjusted using the distance adjustment of the input sleeve.

In summary, the portable heating device can heat an inserted PVC pipe of 2¼ inch outer diameter and 10-foot length evenly on the inside and outside. It uses the confined space around and inside the inserted pipe to heat the pipe evenly to its bendability temperature with little waste of energy. The portable heating device is also inexpensive to manufacture and easy to assemble, and avoids the use of expensive mechanical components such as baffles, barriers, or perforated shields.

The portable heating device can also be used to heat lengths of plastic tubing or pipe longer than about 10 feet in length by adding on another section to the heating tube. It can also be used to straighten a crooked length of PVC pipe to allow bending it back to its original straightness. The device can also be used to heat and bend small segments of PVC pipe, for example, 12 inches or smaller, by sliding the small pieces in and out of the heat tube. It may also be used to heat solid plastic rods or flat 2-inch-wide PVC strips to the point of bending.

The portable heating device may be employed in a wide range of uses. In the electrical industry, it may be used for forming and shaping plastic electrical conduits for protection of electrical circuits and wiring. In the plumbing industry, it may be used for forming and shaping PVC pipe into different designs for home water systems, swimming pool water circulation systems, fish ponds, irrigation systems, and low pressure pneumatic pipe circuits. In the automotive industry, it may be used for harnesses for electrical wiring protection and water protection for control circuits. In the theater industry, it may be used for prop construction, set design creations, and custom creations without using costly metal tubing or wood. In the furniture industry, it may be used for furniture design, and for creating household items for everyday uses like chairs and stools. In the marine industry, it may be used to create rust proof items for high salt environments. In the fishing industry, it may be used to create salt resistant fishing supplies and gear. In the sporting goods and recreation industry, it may be used to create light weight items for camping, sports, etc. In the HVAC industry, it may be used for electrical circuit protection, ducting, water pipe circuits, drain lines and control wiring protection.

The portable heating device may also be employed in the toy industry to create light-weight, safe, and cleanable plastic toys for kids to use. In the health care industry, it may be used to create light weight items for medical use and for assistive devices. In the arts industry, artists can create sculptures and designs or support structures out of PVC piping. In the signage industry, it may be used to create designs in the shapes of alphabets and letters, and also logos and other shapes that can be made with PVC pipe. In the landscaping industry, it may be used for irrigation, fish pond water piping circuits, tree and branch braces, etc. In the fencing industry, it may be used to create inexpensive fence ornaments and decorations. In the costuming industry, it may be used to create light weight support frames for costumes and props.

It is to be understood that many modifications and variations may be devised given the above description of the general principles of the invention. It is intended that all such modifications and variations be considered as within the spirit and scope of this invention, as defined in the following claims.

The invention claimed is:

1. A portable heating device for heating plastic tubing or pipe comprising:
a straight, hollow heating tube made of metal of a given length and inner diameter having an input end and an output end, wherein the inner diameter of the heating tube is selected to be larger than an outer diameter of a standard length of plastic tubing or pipe which is to be inserted into the output end up to the input end of the heating tube, the larger inner diameter being selected to provide sufficient spacing around the outer diameter of the standard plastic tubing or pipe so that a hot air flow in the heating tube can heat the outside of the plastic tubing or pipe as well as its inside;

a hot air gun or other source of forced hot air configured to direct a flow of hot air into the input end of the heating tube down its length to its output end; and a heat adjustment mechanism comprising a manifold having a proximal end clamped to the hot air gun and a manifold tube that is a straight section of tubular pipe which has its distal end telescoped to the input end of the heating tube, wherein telescoping of the distal end of the manifold tube to the input end of the heating tube can be adjusted in length for holding the hot air gun at an adjustable distance from an insert position to which a plastic tubing or pipe is to be inserted to the input end of the heating tube, said telescoping of the manifold tube of the heat adjustment mechanism being operative for adjusting the distance of the hot air gun from the insert position so that the hot air flow directed into the input end of the heating tube will heat the inserted end of the plastic tubing or pipe to within an optimum temperature range that is low enough not to scorch the inserted end, yet is high enough that the hot air flow can soften the length of the plastic tubing or pipe inserted in the heating tube.

2. A portable heating device according to claim 1, wherein the optimum temperature range in proximity to the insert position for the PVC pipe is about 340 to 350 degrees Fahrenheit.

3. A portable heating device according to claim 1, wherein the hot air gun is a conventional hot air blower for hair drying with a heating element that uses about 600 to 1400 watts of electricity.

4. A portable heating device according to claim 1, wherein the heating tube is made of stainless steel pipe of 2½ inch inner diameter and 10-foot length.

5. A portable heating device according to claim 4, wherein the heating tube is encased in an insulation layer and housed in a cylindrical casing.

6. A portable heating device for heating plastic tubing or pipe comprising:

a straight, hollow heating tube made of metal of a given length and inner diameter having an input end and an output end, wherein the inner diameter of the heating tube is selected to be larger than an outer diameter of a standard length of plastic tubing or pipe which is to be inserted into the output end up to the input end of the heating tube, the larger inner diameter being selected to provide sufficient spacing around the outer diameter of the standard plastic tubing or pipe so that a hot air flow in the heating tube can heat the outside of the plastic tubing or pipe as well as its inside; a hot air gun or other source of forced hot air configured to direct a flow of hot air into the input end of the heating tube and down its length to its output end; and a heat adjustment mechanism for holding the hot air gun at an adjustable distance from an insert position to which a plastic tubing or pipe is to be inserted to the input end of the heating tube, said heat adjustment mechanism having an adjustment member for adjusting the distance of the hot air gun from the insert position so that the hot air flow directed into the input end of the heating tube will heat the inserted end of the plastic tubing or pipe to within an optimum temperature range that is low enough not to scorch the inserted end, yet is high enough that the hot air flow can soften the length of the plastic tubing or pipe inserted in the heating tube, and further comprising a heat retaining tail piece in the form of a tube having an input end that is coupled to the output end of the heating tube and an output end equipped with a cooling fan designed to draw the hot air flow through the heating tube at a faster speed and with less temperature drop than without using the heat retaining tail piece.

7. A portable heating device according to claim 1, further comprising an access port for a temperature probe provided in proximity to the input end of the heating tube.

8. A portable heating device according to claim 1, further comprising an access port for a temperature probe provided along the length of the heating tube.

* * * * *